United States Patent
Neumann et al.

[11] Patent Number: 6,033,035
[45] Date of Patent: Mar. 7, 2000

[54] METHOD OF OPERATION OF AN ELECTRONICALLY CONTROLLABLE BRAKE ACTUATION SYSTEM

[75] Inventors: Ulrich Neumann, Robdorf; Lothar Schiel, Hofheim; Hans-Jorg Feigel, Rosbach; Andreas Klein, Bad Homburg, all of Germany

[73] Assignee: ITT Manufacturing Enterprises Inc., Wilmington, Del.

[21] Appl. No.: 08/718,439

[22] PCT Filed: Jan. 30, 1996

[86] PCT No.: PCT/EP96/00355

§ 371 Date: Dec. 16, 1996

§ 102(e) Date: Dec. 16, 1996

[87] PCT Pub. No.: WO96/23678

PCT Pub. Date: Aug. 8, 1996

[30] Foreign Application Priority Data

Jan. 31, 1995 [DE] Germany ............ 195 02 925

[51] Int. Cl.[7] ........................... B60T 7/12
[52] U.S. Cl. ............... 303/113.4; 303/116.2; 303/155
[58] Field of Search ............. 303/155, 113.4, 303/166, 162, DIG. 3, DIG. 4, 113.1, 115.2, 116.2

[56] References Cited

U.S. PATENT DOCUMENTS

| | | |
|---|---|---|
| 4,462,642 | 7/1984 | Leiber .................. 303/113.4 |
| 4,576,419 | 3/1986 | Leiber .................. 303/113.4 |
| 4,756,391 | 7/1988 | Agarwal et al. . | |
| 4,812,777 | 3/1989 | Shirai . | |
| 4,846,534 | 7/1989 | Leiber et al. ........... 303/113.4 |
| 4,904,028 | 2/1990 | Leiber et al. ........... 303/113.4 |
| 5,261,730 | 11/1993 | Steiner et al. ........... 303/113.4 |
| 5,312,172 | 5/1994 | Takeuchi .............. 303/113.4 |
| 5,564,797 | 10/1996 | Steiner et al. ......... 303/113.4 |

FOREIGN PATENT DOCUMENTS

| | | |
|---|---|---|
| 0470858A1 | 2/1992 | European Pat. Off. . |
| 3424912A1 | 1/1986 | Germany . |
| 3803079A1 | 8/1989 | Germany . |
| 4029793A1 | 3/1992 | Germany . |
| 4102497C1 | 5/1992 | Germany . |
| 4217409A1 | 12/1993 | Germany . |
| 4230911A1 | 3/1994 | Germany . |
| 4329140 | 12/1994 | Germany . |
| 4335769C1 | 12/1994 | Germany . |
| 4327206A1 | 2/1995 | Germany . |
| 410006A1 | 9/1995 | Germany . |
| 2100816A | 1/1983 | United Kingdom . |

*Primary Examiner*—Matthew C. Graham
*Attorney, Agent, or Firm*—Rader, Fishman & Grauer PLLC

[57] ABSTRACT

A method of operation of an electronically controllable brake actuation system for anti-lock automotive vehicle brake systems employs a brake system which includes a master brake cylinder operable by an actuating pedal, braking pressure generators which are electromechanically operable by an electronic control unit. The braking pressure generators are directly connected to wheel brakes of a vehicle and are connectable to the master brake cylinder by way of hydraulic connections closable by valves that are electromagnetically operable by the electronic control unit. The system also includes at least one sensor device for identification of the driver wish for deceleration, and at least one simulator chamber interacting with the master brake cylinder. On commencement of a braking operation, a signal representative of the position of the master brake cylinder piston and a signal representative of the actuating speed occurring on the actuating pedal are produced. A length of the time delay, after which the valves are closed upon commencement of the braking operation, is determined by the electronic control unit responsive to at least one of the signals.

12 Claims, 1 Drawing Sheet

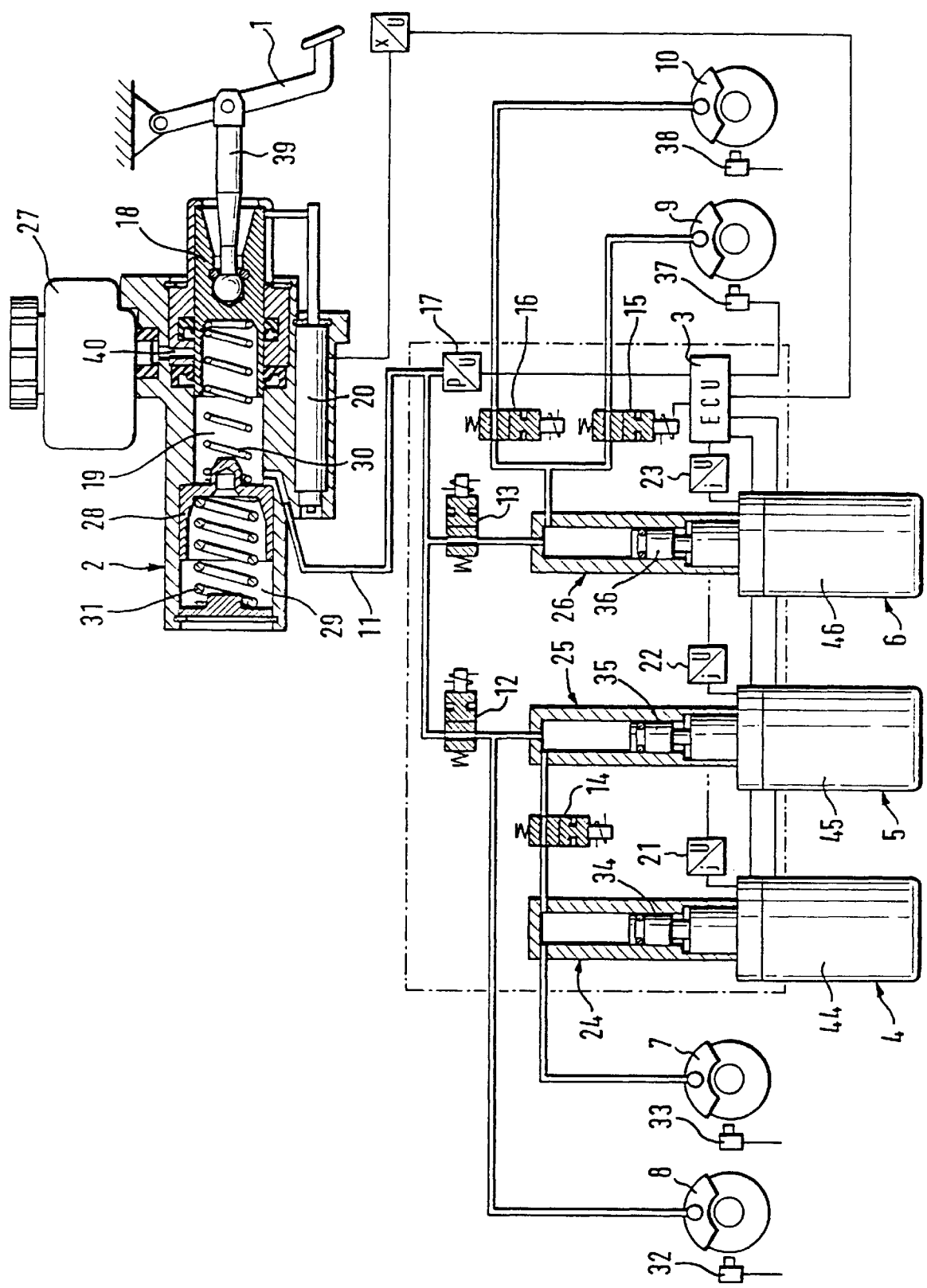

METHOD OF OPERATION OF AN ELECTRONICALLY CONTROLLABLE BRAKE ACTUATION SYSTEM

FIELD OF THE INVENTION

The present invention relates to a method of operation of an electronically controllable brake actuation system for anti-lock automotive vehicle brake systems, including a master brake cylinder operable by an actuating pedal, braking pressure generators which are electromechanically operable by an electronic control unit, which braking pressure generators are directly connected to wheel brakes of a vehicle and are connectable to the master brake cylinder by way of hydraulic connections closable by valves that are electromagnetically operable by the electronic control unit, at least one sensor device for identification of the driver wish for deceleration, and at least one simulator chamber interacting with the master brake cylinder.

BACKGROUND OF THE INVENTION

A known brake actuation system has hydraulic connections between the braking pressure generators and the master brake cylinder which are closed by operation of the solenoid operated separating valves, the closing of which are delayed with respect to pedal actuation. Low-pressure accumulators which are connected to the wheel brakes in the release position of the braking pressure generators, are connected to the pressure chambers of the braking pressure generators. In particular in the event of quick actuation, the response time is shortened and the dynamic behavior of the system is enhanced.

A disadvantage of this known brake actuation system is that due to different actuation speeds, the fluid volume which is furnished for rapid prefilling of the wheel brakes from the master brake cylinder through the separating valves, is not exactly defined after the time-controlled closing of the separating valves, on the one hand. Thus, the fluid volume supplied by the braking pressure generators does not provide an indication of the pressure prevailing in the wheel brakes. On the other hand, the separating valves remain open for the predetermined period even at slow actuation speeds. This is detrimental to the pedal feeling. Further, providing the low-pressure accumulators necessitates great structural efforts.

SUMMARY OF THE INVENTION

An object of the present invention is to provide a method of operation of a brake actuation system of the type referred to in the description of the field of the invention which eliminates the above-mentioned drawbacks so that the initial condition of the wheel brakes after closing of the separating valves is known, and the unnecessarily long opening of the separating valves is prevented during slow actuation.

According to the present invention, this object is achieved in that on commencement of a braking operation, a signal representative of the position of the master brake cylinder piston and a signal representative of the actuating speed occurring on the actuating pedal is produced, and in that the length of the time delay, after which the valves are closed upon commencement of the braking operation, is determined by at least one of the signals.

The position of the master brake cylinder piston is preferably determined by sensing the actuating travel at the actuating pedal.

To produce the signal representative of the actuating speed occurring on the actuating pedal, the signal representative of the actuating travel is subjected to a time derivative processing operation.

The delayed or retarded closing of the separating valves involves the mentioned advantage that the fluid volume taken from the master cylinder assists the pressure increase in the wheel brakes. However, the retarded valve closure is disadvantageous with respect to the pedal feeling because the pedal travel is undesirably increased. The objective is that the braking pressure generators prefill the wheel brakes on commencement of the braking operation providing a jump-in function. If the separating valves remained open during slow actuation, there would even be the risk that fluid volume from the brake system is conducted by the braking pressure generators through the breathering bores into the supply reservoir. Therefore, a principal objective should be to close the separating valves as quickly as possible. Retarded closing of the separating valves should thus be limited to extremely high-dynamics braking operations where the actuating speed exceeds a defined value. This is always the case when a required braking pressure increase in the wheel brakes (specification value, rather than the quantity ascertained by the sensors to determine the driver wish for deceleration) cannot be achieved by the braking pressure generators alone. This fact can be due to dimensioning, for example, excessive fluid volume absorption of the wheel brakes, and/or due to certain conditions, for example, low engine dynamics as a result of low voltage of the vehicle electrical system. Therefore, it is appropriate to make the predetermined value for the limit actuation speed dependent on the actually attainable dynamics of the braking pressure generator. A possible cause, such as low supply voltages or the effect thereof, such as low run-up dynamics, can be taken into account as an influencing variable.

When a minimum actuation speed has been found so that the valves are not closed directly, it is suitable to close the separating valves after a defined fluid volume has been taken from the master brake cylinder. It is desirable to prevent supply of too much fluid volume to the wheel brakes because otherwise the pressure cannot be reduced entirely during anti-lock control operations.

In the event of particularly high actuation speeds, it may be appropriate to reduce the predefined actuation travel to prevent excessive supply of fluid volume to the wheel brakes.

In any case, the fluid volume conducted to the wheel brakes, which is important for rating the wheel pressures, can be determined from the balance in volume between the fluid volume discharged from the master brake cylinder and the fluid volumes discharged from the braking pressure generators.

In case that the fluid volumes are not distributed evenly or reproducibly into the four wheel brakes, the retarded closing of the separating valves can be limited to the front axle in order to maintain proper brake force distribution.

The fluid volume, which is taken up in the simulator chamber, can be determined directly by way of a position sensor sensing the simulator piston, assuming the piston surface area is known, or indirectly by way of the pressure sensor and a fluid volume-pressure characteristic curve memorized in the electronic unit.

In comparison to the pressure sensor, sensing the position of the simulator chamber piston is a low-cost alternative of the redundant recognition of the driver wish for deceleration.

The additional fluid volume in the wheel brakes which is continuously defined in the above-mentioned fluid volume balance can be taken into account for closing the separating valves. It can be achieved that only a defined fluid volume is conducted to the wheel brakes through the separating valves.

Also, the speed of the braking pressure generator pistons can be determined by the method of the present invention.

Finally, according to another aspect of the present invention, the braking pressure generator pistons will assume an initial position that permits a return stroke upon completion of a braking operation. This provision obviates the need for low-pressure accumulators.

An embodiment of the present invention will be explained in detail in the following making reference to the accompanying drawing.

BRIEF DESCRIPTION OF THE DRAWINGS

The sole FIGURE shows an anti-lock automotive vehicle brake system by which the method of the present invention can be implemented.

DETAILED DESCRIPTION OF A PREFERRED EMBODIMENT

The electronically controllable brake actuation system shown in the FIGURE includes a one-circuit master brake cylinder 2 having a piston 18. Piston 18 is biased in opposition to the actuating direction by a resetting spring 30 which is slidable by a piston rod 39 coupled to an actuating pedal 1 to define a pressure chamber 19. Pressure chamber 19 is further defined by a simulator piston 28 biased by a second resetting spring 31. The simulator piston 28, in turn, limits a hydraulic simulator chamber 29 which takes up the pressure fluid volume discharged from the pressure chamber 19 upon displacement of the brake cylinder piston 18. The pressure chamber 19 is connectable to an unpressurized pressure fluid supply reservoir 27 by way of a supply bore 40.

Wheel brakes 7, 8 associated with a first vehicle axle, for example the driven front axle, and wheel brakes 9, 10 associated with a second vehicle axle, for example the non-driven rear axle, are connected to the pressure chamber 19 of the master brake cylinder 2 by way of a hydraulic line 11. Each of the wheel brakes 7, 8 associated with the front axle is connected to an electromechanically operable braking pressure generator 4, 5, while the other wheel brake pair 9, 10 is jointly connected to a third braking pressure generator 6. An electromagnetically operable first separating valve 12 is inserted into the portion of the hydraulic line 11 leading to the front-axle brakes 7, 8, and a second separating valve 13 is inserted into the line to the rear-axle wheel brakes 9, 10. Thus, the wheel brakes 7, 8 and 9, 10 are operable separately of the master brake cylinder 2. An electromagnetically operable two-way/two-position directional control valve 14 is inserted into the connection between the outputs of the braking pressure generators 4, 5 leading to the wheel brakes 7, 8. Valve 14 permits a balance in pressure between the wheel brakes 7, 8 in normal braking operations.

To adjust the pressures introduced into the wheel brakes 9, 10 individually for each wheel, electromagnetically operable multiplex valves 15, 16 are connected upstream of the wheel brakes 9, 10.

All three braking pressure generators 4, 5, 6 have an identical design. Each one of pressure generators 4, 5, 6 includes a simple hydraulic cylinder 24, 25, 26 with a piston 34, 35, 36 slidable therein. Pistons 34, 35, 36 are respectively displaced by a preferably reversible direct current motor 44, 45, 46.

The joint actuation of the direct current motors 44, 45, 46 and the solenoid valves 12, 13, 14, 15, 16 is performed by an electronic control unit 3. The output signals of a travel sensor 20 sensing the actuating travel of the actuating pedal 1, and the output signals of a pressure sensor 17 connected to the pressure chamber 19 of-the master brake cylinder 2 are supplied to the control unit 3 as input signals. Data about the actuating travel of the braking pressure generator pistons 34, 35, 36, provided by the schematically indicated travel or position sensors 21, 22, 23, are furnished as further input signals to the control unit 3. In addition, the individual vehicle wheels (not shown) include wheel sensors 32, 33, 37, 38 having output signals representative of the respective wheel speed which are conducted to the electronic control unit 3 as further input variables.

The operation of the brake actuation system shown in the drawing is as follows:

When braking operation is initiated by depression of the brake actuating pedal 1, the actuating condition, pedal or master brake cylinder piston travel, is sensed by the travel sensor 20 and signaled to the electronic control unit 3. The control signals of the control unit 3 cause actuation of the braking pressure generators 4, 5 and 6. The information about the actuating travel of the master brake cylinder piston 18 from sensor 20, determining the position of piston 18, is supplied to the electronic control unit 3 along with the output signals of the position or travel sensors 21, 22, 23 which are representative of the position of the braking pressure generator pistons 34, 35 and 36. A signal representative of the actuating speed of the actuating pedal 1 or piston 18 is produced by taking a time derivative of the signal representative of the actuating travel of pedal 1 or piston 18 respectively. Control unit 3 determines from this data the pressure fluid volume flows to be supplied by the master brake cylinder 2 and by the braking pressure generators 4, 5, 6. Control unit 3 also produces control signals which close the separating valves 12, 13 and, thereby, separate the braking pressure generators 4, 5 and 6 from the master brake cylinder 2 responsive to the data provided.

When the actuating speed exceeds a defined actuating speed, closing of the separating valves 12, 13 does not occur instantaneously, but only after a specific actuating travel has been covered, or a specific fluid volume has been discharged from the master brake cylinder into the wheel brakes. This means, valve closure takes place with a certain time lag so that hydraulic pressure can develop in the brakes 7, 8, 9, 10 very quickly, especially in the event of a rapid actuation.

The pressure sensor 17 provides a second signal, indicative of a driver wish for deceleration, to the electronic control unit 3. Control unit 3, by way of the brake force distribution system mounted in the unit, calculates the desired brake torques on the vehicle axles. The control signals representative of the calculated brake torques are conducted to the direct current motors 44, 45, 46 of the braking pressure generators 4, 5, 6 which initiate displacement of the braking pressure generator pistons 34, 35, 36 in the actuating direction and, thus, pressure increase in the wheel brakes 7–10. The customary pedal feeling sensed by the driver during braking is ensured by the effect of the pressure that prevails in the pressure chamber 19 of the master brake cylinder 2 and is applied to the simulator piston 28. Simulator piston 28 is displaced in opposition to the force of the resetting spring 31 arranged in the simulator chamber 20. The multiplex valves 15, 16, inserted into the line portions that lead to the wheel brakes 9 and 10, remain open.

The pressure generated by the driver in the master cylinder can also be produced by determining the travel of the simulator piston 28 and evaluating it by making reference to the known pressure-travel characteristic curve of the simulator chambers 29.

Pressure is reduced by a return movement of the braking pressure generator pistons 34, 35, 36, under certain circumstances, by active reversal of the direction of rotation of the direct current motors 44, 45, 46. The additional pressure fluid volume introduced by the driver into the wheel brakes 7–10 is taken up by the hydraulic cylinders 24, 25, 26, in particular in the pressure reduction mode of anti-lock control operations. The pistons 34, 35, 36 of the hydraulic cylinders can perform a defined return stroke beyond the initial position. A pressure retaining mode is achieved by the multiplex valves 15, 16 adopting their closed position, or by the direct current motors staying in their position.

Thus, anti-lock control is performed in a three-channel fashion (front axle two-channel, rear axle one-channel) in the control mode by way of the wheel speed sensors 32, 33, 37, 38, and the braking pressure modulation on the rear axle can be performed according to the "select-low" principle, for example.

The separating valves 12, 13 are driven in the multiplex mode during traction slip control or driving stability control operations.

All valves are in their deenergized condition upon failure of the electronic unit/vehicle electrical system. Both wheel brakes 7, 8 associated with the front axle are connected to the master brake cylinder 2 by way of valves 14, 12, open in their deenergized condition, so that the provisions mandated by law with respect to failure of the electronic unit are satisfied.

Upon hydraulic failure of the brake circuit associated with the front axle, the brake effect "brake-by-wire" mandated by law can always be achieved by the circuit associated with the rear axle. Upon failure of the hydraulic circuit associated with the rear axle, the use of travel sensor 20 or pressure sensor 17 ensures that the brake effect "brake-by-wire" is achieved by the driven front axle.

We claim:

1. A method of operation of an electronically controllable brake actuation system for anti-lock automotive vehicle brake systems, the method providing the steps of:
   providing a master cylinder having a master cylinder piston and operable by an actuating pedal;
   providing an electromechanical braking pressure generator;
   providing an electronic control unit;
   electrically connecting the electronic control unit to the braking pressure generator for the transmission of control signals thereto;
   providing a first hydraulic connection between the braking pressure generator and a wheel brake of a vehicle;
   providing a second hydraulic connection between the braking pressure generator and the master cylinder;
   providing an electromagnetically operable valve in the second hydraulic connection between the braking pressure generator and the master cylinder;
   electrically connecting the electronic control unit to the electromagnetically operable valve for the transmission of control signals thereto;
   displacing the actuating pedal and thereby the master cylinder piston;
   providing a position sensor operably producing an actuation signal representative of a displacement of at least one of the master cylinder piston and the actuating pedal;
   providing a simulator chamber interacting with the master cylinder;
   using the actuation signal to produce an actuation speed signal by taking a derivative with respect to time of the actuation signal;
   determining a delay period based on the actuation speed; and
   closing the electromagnetically operable valve at the end of the delay period.

2. A method of operation of an electronically controllable brake actuation system as claimed in claim 1, wherein when the actuation speed exceeds a predetermined value the delay period equals the time from initiation of actuation to displace a predetermined volume of fluid to the wheel brake from the master cylinder.

3. A method of operation of an electrically controllable brake actuation system as claimed in claim 1, wherein a predetermined value is stored and when the actuation speed is less than the predetermined value the delay period is almost zero.

4. A method of operation of an electrically controllable brake actuation system as claimed in claim 3 wherein the predetermined value is smaller at a low voltage of the vehicle electrical system than at a high voltage of the vehicle electrical system.

5. A method of operation of an electrically controllable brake actuation system as claimed in claim 3 wherein the predetermined value is determined as a function of an actuating speed of the electromechanical braking pressure generator with the predetermined value being relatively smaller at a low actuating speed than at a high actuating speed.

6. A method of operation of an electrically controllable brake actuation system as claimed in claim 1 wherein a length of the delay period is limited by an amount of time to reach a predetermined travel of the master cylinder piston.

7. A method of operation of an electrically controllable brake actuation system as claimed in claim 6 wherein the predetermined travel of the master cylinder piston is influenced by the actuating speed signal.

8. A method of operation of an electrically controllable brake actuation system as claimed in claim 1 wherein a fluid volume conducted from the master cylinder into the wheel brake by way of the separating valve is calculated from a difference between the fluid volume discharged from the master cylinder by the piston and the fluid volume taken up by the simulator chamber.

9. A method of operation of an electrically controllable brake actuation system as claimed in claim 8 wherein a pressure/fluid volume characteristic curve of the simulator chamber is stored in the electronic control unit and a pressure transducer is provided and is connected to the brake actuation system at a location subjected to a pressure which acts on the piston of the simulator and the pressure transducer is electrically connected to the electronic control unit and a volume taken up by the simulator chamber is determined indirectly from a pressure signal from the transducer and the characteristic curve.

10. A method of operation of an electrically controllable brake actuation system as claimed in claim 8 wherein a position of a piston in the simulator chamber is determined and the fluid volume taken up in the simulator chamber is calculated therefrom.

11. A method of operation of an electrically controllable brake actuation system as claimed in claim 10 wherein the position of the piston in the simulator chamber is used to determine the desired vehicle deceleration.

12. A method of operation of an electrically controllable brake actuation system as claimed in claim 8 wherein the length of the time delay is determined by the time of reaching a predefined fluid volume which is conducted from the master cylinder to the wheel brake past the separating valve.

* * * * *